United States Patent Office 3,462,258
Patented Aug. 19, 1969

3,462,258
SYNERGISTIC HERBICIDAL COMPOSITIONS OF IOXYNIL AND BUTURON
Gerbert Linden, Peter Schicke, and Hermann Korner, Ingelheim am Rhein, Germany, assignors to C. H. Boehringer Sohn, Ingelheim am Rhein, Germany, a limited partnership
No Drawing. Filed Nov. 21, 1966, Ser. No. 595,581
Claims priority, application Germany, Nov. 24, 1965, B 84,671
Int. Cl. A01n 9/20
U.S. Cl. 71—105  4 Claims

ABSTRACT OF THE DISCLOSURE

Synergistic herbicidal compositions containing N-(4-chlorophenyl)-N'-methyl-N'-isobutynyl-urea and 3,5-diiodo-4-hydroxybenzonitrile as active ingredients.

---

This invention relates to herbicidal compositions containing N-(4-chlorophenyl)-N'-methyl - N' - isobutynyl-urea in combination with 3,5-diiodo-4-hydroxybenzonitrile as active ingredients.

N-(4-chlorophenyl)-N'-methyl-N'-isobutynyl-urea and 3,5-diiodo-4-hydroxybenzonitrile differ from each other in their herbicidal properties. Upon testing of combinations of both active substances it was surprisingly found that these combinations exhibit a strong synergism of both active ingredients.

Numerous tests with compositions containing varying proportions of the two herbicidal compounds were conducted on different weeds, and the synergism of the combination of the two herbicidal compositions was verified on grasses and broadleaf weeds.

While N - (4-chlorophenyl)-N'-methyl-N'-isobutynyl-urea alone has to be used at a rate of 4 kg. per hectare in combating broadleaf weeds a combination of 3,5-diiodo-4-hydroxybenzonitrile and N-(4-chlorophenyl)-N'-methyl-N'-isobutynyl-urea applied at a rate of 1 kg./hectare has proved equally effective. Moreover, the rate of 4 kg./hectare of N - (4-chlorophenyl)-N'-methyl-N'-isobutynyl-urea lies precariously near the limit of tolerance of corn.

For the experiments corn and weeds were sown for the logarithmic test.

Lolium perenne was used as a particularly resistant type of grass.

For the preparation of the herbicidal compositions according to the invention, N-(4-chlorophenyl)-N'-methyl-N'-isobutynyl-urea was used as a wettable powder consisting of 50% by weight of the urea compound and the remainder an inert carrier, and 3,5-diiodo-4-hydroxybenzonitrile was used as an aqueous 40% emulsion concentrate, which are customary forms of application.

The tests were performed and evaluated twice; the results of the final evaluation are summarized in Tables I and II.

In Table I, the limiting dose (LD90) required for 90% effectiveness is given in liters or kg./hectare of the preparation, and next to this the synergism, calculated according to the method of Yen-Pei Sun and E. R. Johnson, Journal of Economic Entomology, vol. 53, 887–892, is given, as expressed by the so-called "Co-toxicity-coefficient" (C.T. coefficient). In regard to the combined effect of the two components, the following meanings apply:

C.T. coefficient=100 means an additive action.
C.T. coefficient smaller than 100 means an antagonistic action.
C.T. coefficient greater than 100 means a synergistic action.

TABLE I

| Preparation | Tested dose range, kg./l./ha. | Mixing ratio | Effect on various weeds and stages of development | | | | | |
|---|---|---|---|---|---|---|---|---|
| | | | Sinapis | | Lolium | | Stellaria | |
| | | | D6 | C.T. coefficient | E4-5 | C.T. coefficient | D4-5 | C.T. coefficient |
| N-(4-chlorophenyl)-N'-methyl-N'-isobutynylurea | 0.5-5 | | 4.2 | | 4.2 | | 1.1 | |
| 3,5-diiodo-4-hydroxybenzonitrile | 0.25-2.5 | | 0.4 | | >2.5 | | >2.5 | |
| N-(4-chlorophenyl)-N'-methyl-N'-isobutynylurea/3,5-diiodo-4-hydroxybenzonitrile | 0.25-2.5<br>0.25-2.5 | 1:1 | 0.3<br>0.3 | 115 | 1.7<br>1.7 | 127 | 0.4<br>0.4 | >185 |
| Do | 0.25-2.5<br>0.12-1.2 | 2:1 | 0.4<br>0.2 | 163 | 2.1<br>1 | 144 | 0.4<br>0.2 | >218 |
| Do | 0.5-5<br>0.12-1.2 | 4:1 | 0.7<br>0.2 | 152 | 2.25<br>0.56 | 168 | 0.9<br>0.2 | >118 |

The designations D4–5, D6 and E4–5, represent the stages of development of the plants, classified according to Bulletin No. 27 of the Biologische Bundesanstalt für Land- and Forstwirtschaft (Biological Institue for Agriculture and Forestry of the Federal Republic of Germany).

An analogous test on corn and Galium shows the strongly synergistic herbicidal action of the composition on Galium. Galium cannot practically be combated with N-(4-chlorophenyl)-N'-isobutynyl-urea, because in many cases the doses necessary for this purpose prove harmful to the agricultural plants.

Table II shows the synergistic herbicidal action of the combination compositions on Galium. From these results it can be concluded that Galium growing among agricultural plants can be effectively combated with the aid of the combination compositions according to the invention.

Analogous to Table I, Table II indicates the limiting dose (LD 90) required for a 90% effectiveness and the C.T. coefficient. D1 indicates the development phase of the plant corresponding to the explanation given for Table I.

TABLE II

| Preparation | Tested dose range, kg./l./ha. | Mixing ratio | Gallium D1 | C.T. coefficient |
|---|---|---|---|---|
| N-(4-chlorophenyl)-N'-methyl-N'-isobutynyl-urea | 0.6-6 | | 3.4 | |
| 3,5-diiodo-4-hydroxybenzonitrile | 0.5-5 | | 1.8 | |
| N-(4-chlorophenyl)-N'-methyl-N'-isobutynyl-urea/3,5-diiodo-4-hydroxybenzonitrile | 0.3-3<br>0.5-5 | 0.6:1 | 0.6<br>1.1 | 119.9 |
| Do | 0.3-3<br>0.25-2.5 | 1.2:1 | 0.6<br>0.5 | 151.5 |
| Do | 0.6-6<br>0.25-2.5 | 2.4:1 | <0.6<br><0.25 | >293 |

No satisfactory results have been attained in combating fox-tail grass (*Alopecurus myosuroides*) with N-(4-chlorophenyl) - N' - methyl-N'-isobutynyl-urea, since the minimum dose lies precariously near the limit of tolerance of cereal grains.

The results shown in Table II indicate the synergistic effect of the compositions according to the invention against fox-tail grass. The test was conducted on *Alopecurus myosuroides* in the development stage D2–3. It proved that the composition according to the invention is capable of effectively combating fox-tail grass.

TABLE III

[Effect of the test preparation on Alopecurus among beets (herbicidal limiting dose LD 90 in liters or kg./hectare preparation and C.T. coefficient of the combination)]

| Preparation | Tested dose range, kg./l./ha. | Mixing ratio | Alopecurus LD90 | C.T. coefficient |
|---|---|---|---|---|
| 3,5-diiodo-4-hydroxybenzonitrile | 0.5-5 | | >5 | |
| N-(4-chlorophenyl)-N'-methyl-N'-isobutynyl-urea | 0.5-5 | | >5 | |
| N-(4-chlorophenyl)-N'-methyl-N'-isobutynyl-urea/3,5-diiodo 4-hydroxybenzonitrile | 0.5-5<br>0.25-2.5 | 2:1 | 2.75<br>1.37 | 235 |

The above tests proved that combinations of N-(4-chlorophenyl)-N'-methyl-N'-isobutynyl-urea and 3,5-diiodo-4-hydroxybenzonitrile have a synergistic effect; in other words, the effectiveness of the combination of the two active ingredients exceeds the additive effect of both components.

Thus, the compositions according to the present invention make it possible to achieve the same herbicidal effect with substantially smaller doses of the active ingredients. In addition to the reduced cost, the smaller quantities of active ingredients provide significantly improved cereal grain tolerance and a much wider range of application of the herbicidal compositions.

While the present invention has been illustrated with the aid of cerain specific embodiments thereof, it will be readily apparent to others skilled in the art that the invention is not limited to these particular embodiments and that various changes and modifications may be made without departing from the spirit of the invention.

We claim:
1. A herbicidal composition consisting essentially of an inert carrier and a herbicidally effective amount of a mixture of N-(4-chlorophenyl)-N'-methyl-N'-isobutynyl-urea and 3,5-diiodo-4-hydroxybenzonitrile.
2. A herbicidal composition as in claim 1, wherein the weight ratio of the urea compound and the benzonitrile compound in said mixture is from 1:1 to 6:1, respectively.
3. A herbicidal composition as in claim 1, wherein the weight ratio of the urea compound and the benzonitrile compound in said mixture is from 2:1 to 5:1, respectively.
4. The method of killing weeds which comprises contacting said weeds with a herbicidal composition according to claim 1.

References Cited

UNITED STATES PATENTS

| 3,149,955 | 9/1964 | Fischer et al. | 71—120 |
| 3,278,291 | 10/1966 | Evans | 71—105 |
| 3,326,658 | 6/1967 | Harris et al. | 71—105 |

OTHER REFERENCES

Netherlands application 6,411,452, Apr. 5, 1965, assigned to Amchem 71/105.

LEWIS GOTTS, Primary Examiner

M. KASSENOFF, Assistant Examiner

U.S. Cl. X.R.

71—120